Oct. 2, 1951      M. H. LEVY ET AL      2,569,998
SAFETY AUTOMOBILE WHEEL SWITCH DEVICE
Filed Jan. 26, 1949      2 Sheets-Sheet 1
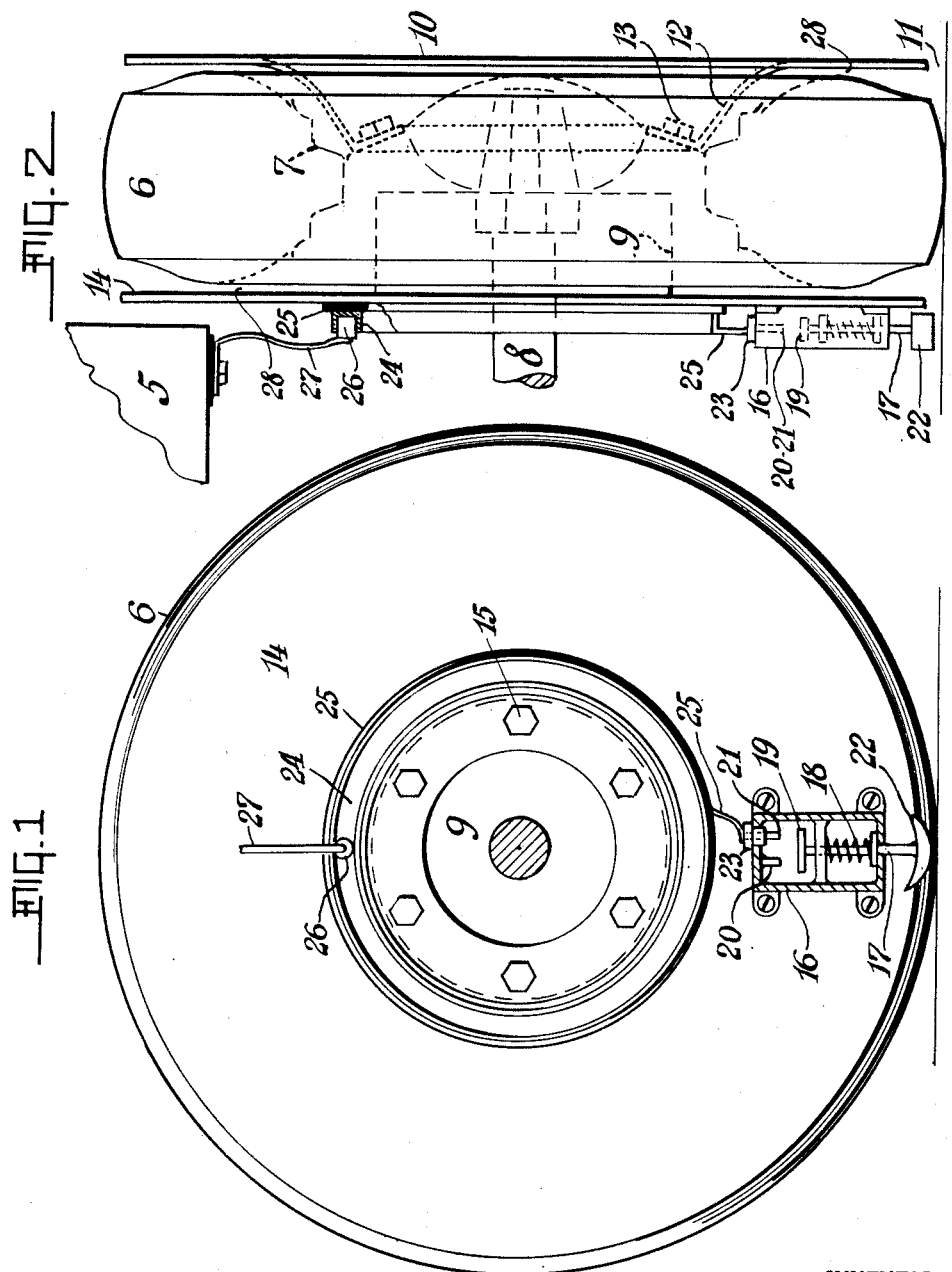
INVENTORS
Max H. Levy
Raymond A. Donovan
BY Joan E. A. Konigsberg Oct. 2, 1951   M. H. LEVY ET AL   2,569,998
SAFETY AUTOMOBILE WHEEL SWITCH DEVICE
Filed Jan. 26, 1949   2 Sheets-Sheet 2
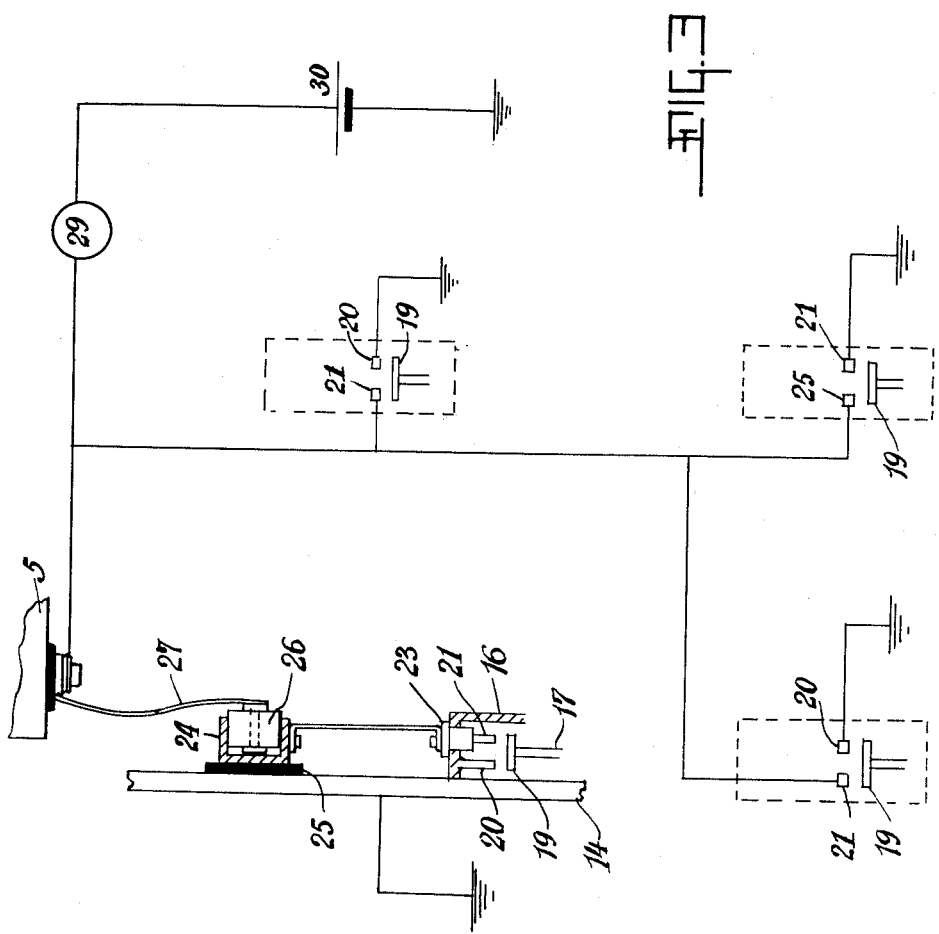
Max H. Levy
Raymond A. Donovan
INVENTORS Patented Oct. 2, 1951

2,569,998

UNITED STATES PATENT OFFICE 2,569,998

SAFETY AUTOMOBILE WHEEL SWITCH DEVICE

Max H. Levy and Raymond A. Donovan, Brooklyn, N. Y.

Application January 26, 1949, Serial No. 72,778

1 Claim. (Cl. 200—58)

The object of our invention is to provide a novel and improved safety automobile wheel device whereby the driver of an automobile is able to drive his car even though a tire thereon is deflated and whereby the driver may obtain notice of a flat or deflated tire in time to prevent the complete destruction of the tire and especially of the tire tube.

Primarily the object of our invention is to provide a safety disk to be mounted upon a standard automobile wheel with tire thereon, the disk being of a circumferentially outside diameter a predetermined amount less than the circumferentially outside diameter of the properly inflated tire. Then if a tire is deflated, the wheel will be lowered and the disk will contact and run upon the ground. The particular wheel will no longer run upon the deflated tire but on the disk as if the wheel were solid and trouble such as ordinary results from driving on a deflated tire will be eliminated.

Our invention may be used in the form of a single disk mounted upon the wheel. Preferably however, we propose to use two disks, one upon each side of the wheel for the better support of the wheel when the tire between the disks becomes deflated. The rigid disk on the wheel will itself serve as a signal of deflation of the tire because the driver will become aware of the resulting uneven driving and the disk will serve as an audible signal through its contact with the ground as the car proceeds.

However, we also propose to incorporate in the safety device a signalling mechanism such as a lamp or a bell upon the dashboard of the automobile for notifying the driver when a wheel is being driven on the disk instead of upon a tire.

In the accompanying drawings illustrating the invention Fig. 1 is a view in elevation of the inside of an automobile wheel equipped with the safety disk, parts being in section. Fig. 2 is a right hand view of Fig. 1 with parts in section and parts broken away. Fig. 3 is a wiring diagram.

In Fig. 2 the automobile is represented by a part of the car body as at 5. The tire 6 is mounted upon the wheel 7 shown in dotted lines within the tire outline and having the axle 8, a brake drum being shown at 9, all in conventional outline. The numeral 10 indicates the outside safety disk embodying our invention. The outside diameter of the disk is such that when the disk is secured to the wheel, the disk does not touch the ground but is spaced therefrom as shown at 11. The disk will be shaped to fit the standard forms of auto wheels. In the drawing the disk is shown as having an inturned or dished circular flange 12 which is secured to the wheel by bolts 13 so that the inner surface of the disk is axially spaced from the outer surface of the tire as indicated at 28. The drawing is merely an example illustration of mounting the disk upon the wheel. When the tire 6 becomes deflated the disk will be lowered and contact the ground and the wheel will then run on the disk instead of upon the tire and the effect will be as if the wheel were solid.

Preferably a second inside safety disk will be used. The disk 14 will be shaped so as to fit the inside construction of the wheel and spaced therefrom as at 28, the same as the outer disk. In the drawing the disk 14 is shown as being mounted upon the brake drum 9 by bolts 15, Fig. 1. If now the tire 6 becomes deflated, the wheel will run upon the two disks 10 and 14 and spoilage of the tire and tire tube will be avoided.

If a signalling device is deemed desirable it may be constructed as follows. On the inside of the inner disk 14 there is mounted a switch housing 16 having a spring pressed plunger 17 guided therein. A spring 18 presses the plunger outward and normally prevents the plunger head 19 from bridging two contacts 20 and 21. The plunger carries a shoe 22 which is arranged to touch the ground when a tire is deflated and whereby the plunger will be pushed inward and the head 19 will close a circuit across the contacts 20 and 21. The contact 20 may be a part of the housing 16 and forms a ground connection on the disk 14. The contact 21 is carried by an insulating nipple 23 which extends into the switch housing. Upon the disk 14 there is secured a circular track 24 which is insulated from the disk by a circular pad 25. The track is connected to the contact 21 by a suitable connection 25. In the track runs a roller contact 26 rotatably carried by a flexible or yielding springy connection 27 secured to the car 5 but insulated therefrom.

The diagram in Fig. 3 includes four signalling stations, one for each wheel, and each station having the ground contact 20 and the live contact 21 to be closed by the plunger head 19. All the live contacts 21 are connected to a lamp 29 and a battery 30. All the ground contacts 20 are grounded on the car on the four disks 14, one on each wheel.

If now any one tire is deflated the signalling circuit through the lamp will be closed and the driver notified. The circuit for the front left wheel may be traced in Fig. 3 as follows: From the battery to ground, to contract 20, through plunger head 19, to contact 21, via connection 25 to the track 24, through the roller 26 and connection 27 to the lamp 28 and back to the battery.

As the car moves along on normally inflated tires, the plunger shoe 22 may momentarily be pushed inward by obstructions in the ground and of course the lamp will then light up. This will only be a momentary flicker of light which is not objectionable. When however, a tire is deflated so that the wheel runs on the disks, the circuit will be closed once for each rotation of the wheel. There will thus be a continuous flicker or blinking of the lamp and the driver will know that a tire is deflated and needs attention.

While we have disclosed our invention in its preferred form, we claim all modifications thereof as fairly fall within the scope of the appended claim.

We claim:

A device of the character described including, in combination, a rotatable support having a predetermined limited movement in its plane of rotation, a circular disk mounted upon said support to rotate and move therewith, a circular conducting grooved member, means for securing said grooved member to the said disk in non-conduction relation thereto, a roller in said grooved member, flexible means supporting said roller in said grooved member, a normally open switch mounted upon the said disk and connected to said grooved member, a plunger in said switch to close the same, a spring for normally maintaining said plunger in non-closing position and means on the plunger to automatically move the same into switch closing position to close said circuit when said rotatable support moves vertically beyond the said predetermined limited range of vertical movement thereof.

MAX H. LEVY.
RAYMOND A. DONOVAN.

REFERENCES CITED

The following references are of record in the file of this patent:

UNITED STATES PATENTS

| Number | Name | Date |
| --- | --- | --- |
| 1,601,604 | Reeder | Sept. 28, 1926 |
| 1,638,983 | Crone | Aug. 16, 1927 |
| 1,646,164 | Moscate | Oct. 18, 1927 |
| 1,965,058 | Seabra | July 3, 1934 |
| 2,385,215 | MacDicken | Sept. 18, 1945 |
| 2,400,107 | Dyke | May 14, 1946 |

FOREIGN PATENTS

| Number | Country | Date |
| --- | --- | --- |
| 340,265 | France | June 1, 1904 |